(12) United States Patent
Wyle et al.

(10) Patent No.: US 7,636,886 B2
(45) Date of Patent: Dec. 22, 2009

(54) SYSTEM AND METHOD FOR GROUPING AND ORGANIZING PAGES OF AN ELECTRONIC DOCUMENT INTO PRE-DEFINED CATEGORIES

(75) Inventors: David A. Wyle, Newport Coast, CA (US); Makarand Karkare, Deonar (IN)

(73) Assignee: SurePrep LLC, Newport Beach, CA (US)

( * ) Notice: Subject to any disclaimer, the term of this patent is extended or adjusted under 35 U.S.C. 154(b) by 717 days.

(21) Appl. No.: 10/422,133

(22) Filed: Apr. 24, 2003

(65) Prior Publication Data

US 2004/0216057 A1    Oct. 28, 2004

(51) Int. Cl.
G06F 17/24 (2006.01)
G06F 3/048 (2006.01)
G06F 17/21 (2006.01)

(52) U.S. Cl. .................. 715/277; 715/222; 715/223; 715/251; 715/776; 715/739

(58) Field of Classification Search .................. 715/522, 715/525, 537, 708, 730, 739, 511, 513, 517, 715/222, 277, 223, 776, 251
See application file for complete search history.

(56) References Cited

U.S. PATENT DOCUMENTS

| | | | |
|---|---|---|---|
| 4,754,326 A | 6/1988 | Kram et al. .................. 364/900 |
| 5,054,096 A | 10/1991 | Beizer | |
| 5,144,115 A | 9/1992 | Yoshida | |
| 5,404,294 A | 4/1995 | Karnik | |
| 5,737,599 A * | 4/1998 | Rowe et al. .................... 707/10 |
| 5,787,295 A | 7/1998 | Nakao .......................... 395/761 |
| 5,878,215 A | 3/1999 | Kling et al. | |
| 5,923,842 A | 7/1999 | Pedersen et al. | |
| 5,940,811 A | 8/1999 | Norris | |
| 5,963,926 A | 10/1999 | Kumomura | |
| 6,003,019 A | 12/1999 | Eaton et al. | |
| 6,009,442 A | 12/1999 | Chen et al. ................... 707/522 |
| 6,012,050 A | 1/2000 | Eaton et al. | |
| 6,021,400 A | 2/2000 | Gallacher et al. | |
| 6,128,633 A | 10/2000 | Michelman et al. ......... 707/525 |
| 6,144,380 A | 11/2000 | Shwarts et al. .............. 345/350 |
| 6,173,285 B1 | 1/2001 | Nishita et al. ................. 707/10 |
| 6,202,052 B1 | 3/2001 | Miller | |
| 6,209,095 B1 | 3/2001 | Anderson et al. ........... 713/176 |
| 6,226,752 B1 | 5/2001 | Gupta et al. | |
| 6,237,011 B1 | 5/2001 | Ferguson et al. ............ 707/515 |
| 6,272,484 B1 | 8/2001 | Martin et al. .................. 707/1 |

(Continued)

OTHER PUBLICATIONS

Harvey, Greg. Adobe Acrobat 5 PDF For Dummies, 2002, Wiley Publishing Inc., pp. 13-34.*

(Continued)

Primary Examiner—Namitha Pillai
(74) Attorney, Agent, or Firm—Snell & Wilmer L.L.P.

(57) ABSTRACT

A system and method for rearranging a plurality of pages of an electronic document is disclosed. The method might include the steps of providing a bookmark profile that includes a plurality of categories, receiving a description pertaining to one of the plurality of categories, associating a page of the plurality of pages with the description, inserting the description into the bookmark profile, and arranging the plurality of pages according to the bookmark profile.

12 Claims, 10 Drawing Sheets

U.S. PATENT DOCUMENTS

| | | | |
|---|---|---|---|
| 6,298,357 B1 | 10/2001 | Wexler et al. | 707/513 |
| 6,311,165 B1 | 10/2001 | Coutts et al. | |
| 6,338,138 B1 | 1/2002 | Raduchel et al. | |
| 6,369,811 B1 * | 4/2002 | Graham et al. | 715/764 |
| 6,473,741 B1 | 10/2002 | Baker | |
| 6,476,930 B1 | 11/2002 | Roberts et al. | 358/1.18 |
| 6,480,866 B2 * | 11/2002 | Mastie | 715/525 |
| 6,510,466 B1 | 1/2003 | Cox et al. | |
| 6,539,479 B1 | 3/2003 | Wu | |
| 6,567,628 B1 | 5/2003 | Guillemin et al. | 399/82 |
| 6,567,789 B1 | 5/2003 | Baker | |
| 6,572,661 B1 | 6/2003 | Stern | 715/501.1 |
| 6,584,505 B1 | 6/2003 | Howard et al. | |
| 6,598,023 B1 | 7/2003 | Drummond et al. | |
| 6,601,173 B1 | 7/2003 | Mohler | |
| 6,658,464 B2 | 12/2003 | Reisman | |
| 6,721,783 B1 | 4/2004 | Blossman et al. | |
| 6,957,384 B2 * | 10/2005 | Jeffery et al. | 715/501.1 |
| 7,171,615 B2 | 1/2007 | Jensen et al. | |
| 7,234,103 B1 | 6/2007 | Regan | |
| 7,257,553 B1 | 8/2007 | Baker | |
| 2001/0037268 A1 | 11/2001 | Miller | |
| 2001/0044762 A1 | 11/2001 | Nault | |
| 2002/0161698 A1 | 10/2002 | Wical | |
| 2002/0161796 A1 * | 10/2002 | Sylthe | 707/500 |
| 2003/0036912 A1 | 2/2003 | Sobotta et al. | |
| 2003/0061131 A1 | 3/2003 | Parkan, Jr. | |
| 2003/0163547 A1 | 8/2003 | Beisty et al. | |
| 2003/0233296 A1 | 12/2003 | Wagner | |
| 2004/0024665 A1 | 2/2004 | Foster | |
| 2004/0088233 A1 | 5/2004 | Brady et al. | |
| 2004/0150854 A1 * | 8/2004 | Sprague et al. | 358/1.15 |
| 2004/0225581 A1 | 11/2004 | Wyle et al. | |
| 2004/0243626 A1 | 12/2004 | Wyle et al. | |
| 2005/0038722 A1 | 2/2005 | Throndson et al. | |
| 2005/0102283 A1 | 5/2005 | Anderson et al. | |
| 2006/0026083 A1 | 2/2006 | Wyle | |
| 2006/0155618 A1 | 7/2006 | Wyle | |
| 2006/0178961 A1 | 8/2006 | Stanley et al. | |
| 2007/0033118 A1 | 2/2007 | Hopkinson | |
| 2008/0082432 A1 | 4/2008 | Baker | |
| 2008/0319882 A1 | 12/2008 | Wyle | |

OTHER PUBLICATIONS

Cia, Patricia. Managing Your Bookmarks & Favorites, Feb. 25, 1999, SLA, p. 2.*

MSPivot, Microsoft Office Excel PivotTable Reports 101, downloaded on Sep. 14, 2008 from http://office.microsoft.com/em-us/excel/HA010346321033.aspx?ac=, 12 pages.

* cited by examiner

SYSTEM AND METHOD FOR GROUPING AND ORGANIZING PAGES OF AN ELECTRONIC DOCUMENT INTO PRE-DEFINED CATEGORIES

BACKGROUND OF THE INVENTION

1. Field of the Invention

The present invention relates generally to a system and method for organizing pages of an electronic document, and more particularly to a system and method for grouping and organizing pages of an electronic document into pre-defined categories.

2. Description of the Related Art

Many software programs are currently available that allow a user to scan in a number of paper documents into a single electronic document, which can be sent to a recipient via electronic mail (or shared via a network or the Internet) and can be viewed by the recipient using a document viewing software program. One example of a document scanning and viewing software program is Adobe Acrobat from Adobe Systems Incorporated of San Jose, Calif. Using the Adobe Acrobat software program, paper documents can be scanned into a single electronic document, which is often referred to as a portable document format (PDF) document or file, and can be viewed by the user and the recipient. The electronic document is typically arranged as a sequence of individual pages where each page can have objects, such as text, graphics, images, color spaces, annotations, and so on. The software programs advantageously allow recipients to immediately view, print and store the electronic document.

In many instances, however, the paper documents are scanned in, in a random, unorganized sequence, which makes it very difficult and time consuming to find a particular page within the electronic document. One solution can be to manually organize the paper documents prior to scanning, however, the individual organizing the paper documents or performing the scanning may not have the skill, knowledge or time needed to correctly organize the paper documents. Moreover, organizing the paper documents prior to scanning can be very resource intensive, time consuming and wasteful. Also, organizing the pages prior to scanning might take care of the order of the pages, but it does not generate a table of contents or tree structure (like the bookmarks) that makes it easy to find any particular page within the stack of pages. For example, if K-1s are always located at the end and if there are 40 K-1s in a stack of paper documents, without the table of contents or bookmark tree structure, one might spend a significant amount of time looking for a particular K-1 even though the pages are arranged in a pre-specified order.

Ultimately, the recipient may want the pages of the electronic document organized in a specific order (an order that is unknown to the individual) so that locating a page or pages can be accomplished in an efficient and timely manner. For example, a taxpayer may scan in over fifty pages of tax documents in a random order into an electronic document and send the electronic document to an accountant or accounting firm for the preparation of an income tax return. In this situation, the accountant may need to organize the pages of the electronic document in a specific order so that navigating through the electronic document during the preparation and review of the income tax return can be performed in an accurate and efficient manner. The taxpayer may also want the pages organized so that navigating through the electronic document, when reviewing the completed income tax return, can be performed in a quick, accurate and efficient manner.

One way the recipient of the scanned in electronic document can organize the pages is by using the bookmarks and thumbnails features of the software program. For example, referring to FIGS. 1 and 2, once a page of the electronic document is displayed in a view area 100 of a display screen 101, the user can use a pointing device, such as a mouse, to select a bookmarks tab 102, which opens a bookmark window 200 that allows the user to view bookmark features and select bookmark functions. In particular, the user can select a bookmark button 202 to create a new bookmark, a trash can button 204 to delete a selected bookmark or an expand button 206 to expand a current bookmark. To bookmark a particular page of the electronic document, the page is displayed in the view area 100 and the user selects the bookmark button 202 to create a new bookmark 300 and inputs, using a keyboard or other input device (not shown), a title 302, e.g., B-2, for the bookmark 300 (see FIG. 3). The entire title 302 must be typed in each time a new bookmark is created and once created, the title 302 will appear next to the bookmark 300 in the bookmark window 200. Each page must be manually bookmarked using the bookmark button 202 and the keyboard.

FIG. 4 is a view of a display screen 101 illustrating a number of bookmarks 300 and corresponding titles 302 for the bookmarks 300 in the bookmark window 200. To organize the bookmarks 300, the user can move a particular bookmark 300 by dragging and dropping the bookmark 300 to another location within the existing bookmarks. For example, the bookmark B-2 can be dragged, using a pointing device, and dropped between bookmark B-1 and the bookmark C-1, as shown in FIG. 5. Even though the bookmark B-2 has been moved, the sequence of the page corresponding to the bookmark does not change. That is, even though the bookmarks may be arranged according to the user's preferences, the pages of the electronic document remain in the scanned in order.

The sequence of the pages of the electronic document can be viewed by selecting a thumbnails tab 600 that opens a thumbnail window 602, which displays a small view of the pages of the electronic document, as shown in FIG. 6. Below each page is a number that represents the page number of the electronic document. In the illustrated example, the B-1 page is the third page of the electronic document even though the bookmark B-1 is the second bookmark. Therefore, to correctly organize the document, the B-1 page needs to be moved to the second page of the electronic document to correspond to the order of the bookmarks 300. The B-1 page can be moved by dragging and dropping the B-1 page to be between the first page and the second page in the thumbnail window 602. Hence, the B-1 page now corresponds to the bookmark B1.

As described above, the conventional process of organizing pages of an electronic document can be difficult, time consuming and error prone. For example, manually creating consistent bookmark titles for each page of a sixty-page electronic document can take several hours. Even after several hours of work, the resulting electronic document still fails to be a standardized consistent organized document with, for example, a hierarchy of consistent bookmarks and a table of contents.

SUMMARY OF THE INVENTION

One drawback of conventional processes is the necessity to bookmark each page of the electronic document. For example, even if five consecutive pages are related to each other, each of the five pages must be bookmarked; otherwise, the unbookmarked pages cannot be arranged in a particular order. Another drawback of conventional processes is the difficulty in ensuring that all related pages are grouped together. If three pages of a paper document are located at, for example, pages 5, 12 and 47 of the electronic document, the user may inadvertently enter a different description to bookmark each of the three pages, thus making it difficult for the related pages to be grouped together. Additional drawbacks of conventional processes include the difficulty in maintaining a standardized consistent scheme of book marking, providing a hierarchy of bookmarks, generating a table of contents, and creating an organized electronic document. For example, dragging and dropping bookmarks and pages of an electronic document is time consuming, error prone, and concentration and mind intensive. Also, a table of contents can be generated by manually typing in each bookmarked description. Therefore, a need exists for a system and method for grouping and organizing pages of an electronic document into pre-defined bookmarks that overcomes the drawbacks of conventional processes.

In accordance with the present invention, a computer-implemented method for rearranging a plurality of pages of a source electronic document includes the steps of providing a bookmark profile that includes a plurality of categories, receiving a description pertaining to one of the plurality of categories, associating a page of the plurality of pages with the description, inserting the description into the bookmark profile, and arranging the plurality of pages according to the bookmark profile.

Another embodiment of the present invention is a method for generating a structured electronic document from an unstructured electronic document. The method includes providing a plurality of categories, wherein each of the plurality of categories has at least one subcategory, receiving a description associated with at least one of the subcategories, wherein the description includes a description identifier, assigning the description identifier to a page of the unstructured electronic document, and arranging a plurality of pages of the unstructured electronic document according to a plurality of description identifiers.

Another embodiment of the present invention is a computer program for constructing a hierarchically organized electronic document from an unstructured electronic document, including instructions operable to cause a computer to display a plurality of categories and a plurality of subcategories, display a first page of an unstructured electronic document, receive a first subcategory identifier corresponding to a first selected subcategory, and receive a first description identifier describing the first page. The computer program further includes instructions to display a second page of the unstructured electronic document, receive a second subcategory identifier corresponding to a second selected subcategory, receive a second description identifier describing the second page, and arrange the first page and the second page according to the order of the plurality of categories and the plurality of subcategories.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the present invention will now be described with reference to the drawings. the drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears. The term "bookmark" can refer to a page label, indicator, instance, link or other means of identifying an object or page.

Figure 1:
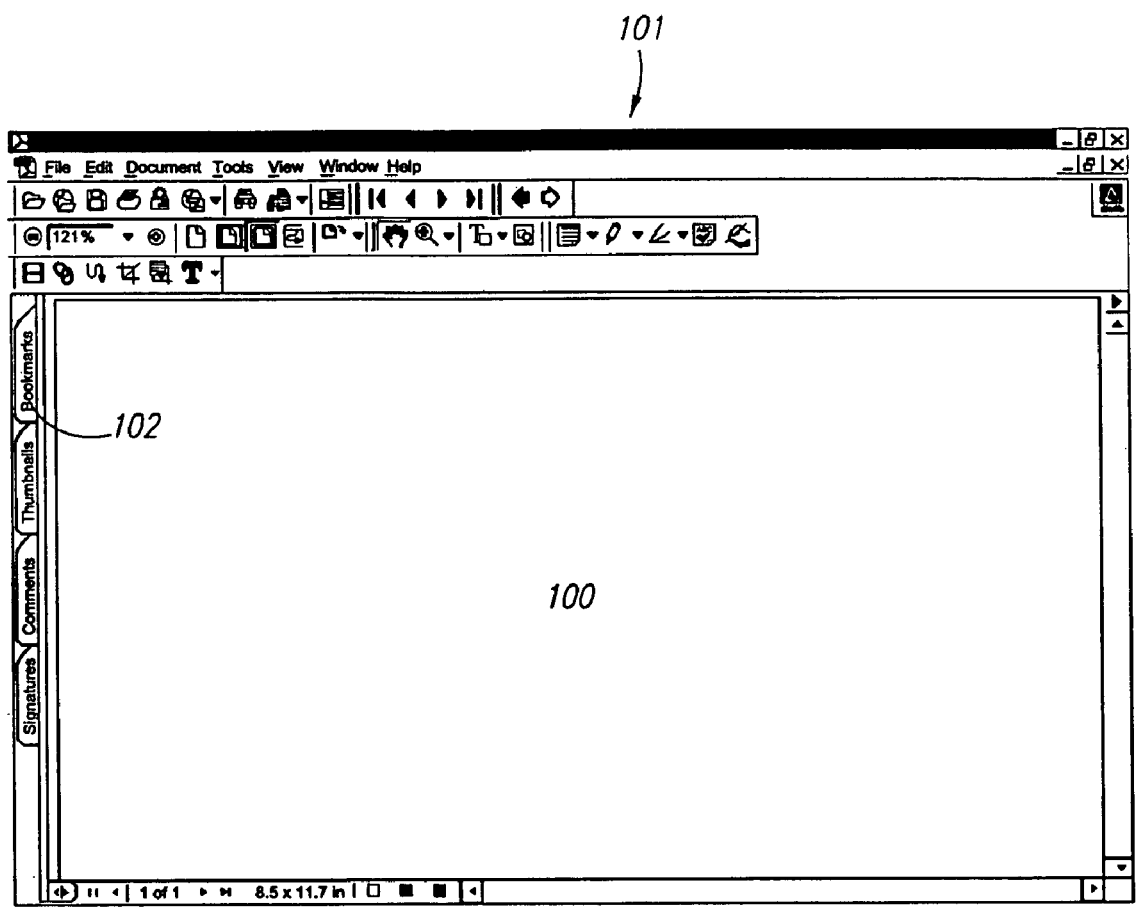
FIG. 1 is a view of a prior art display screen illustrating a bookmark tab and a page from an electronic document.
Figure 2:
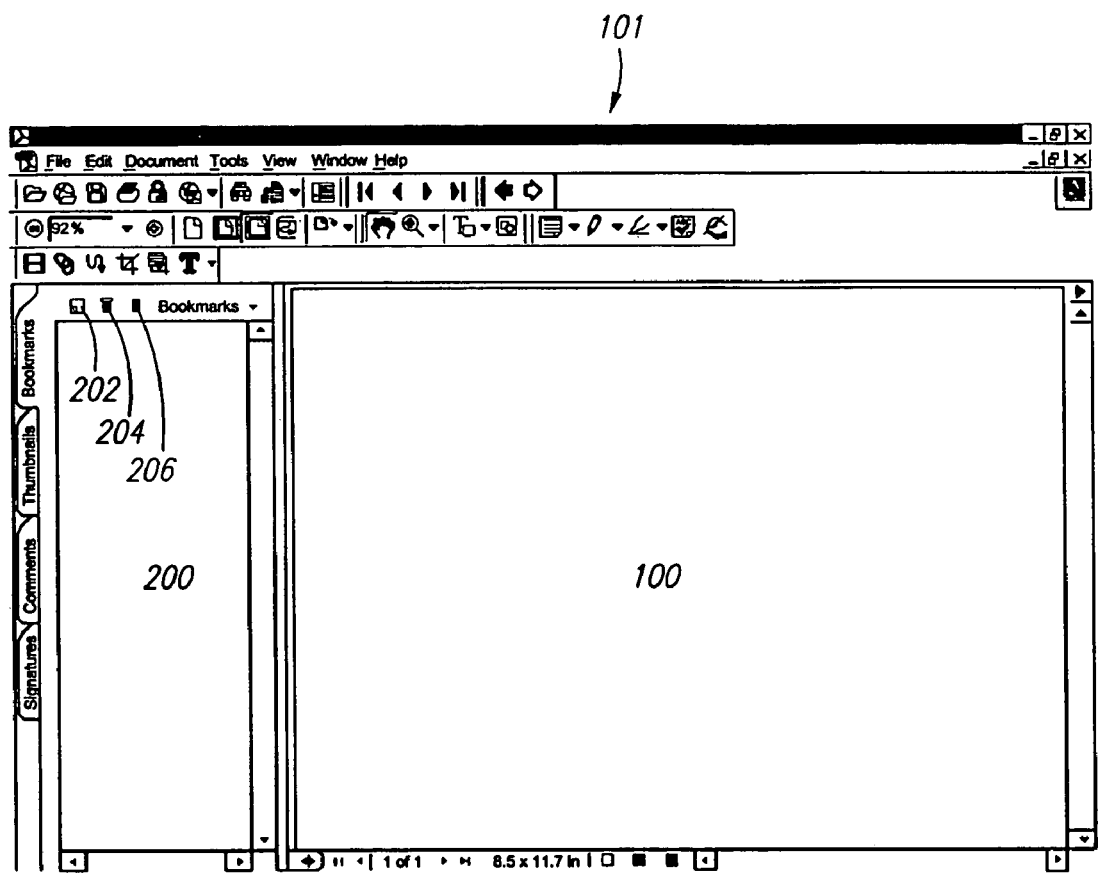
FIG. 2 is a view of a prior art display screen illustrating a bookmark window positioned adjacent to a page from an electronic document.
Figure 3:
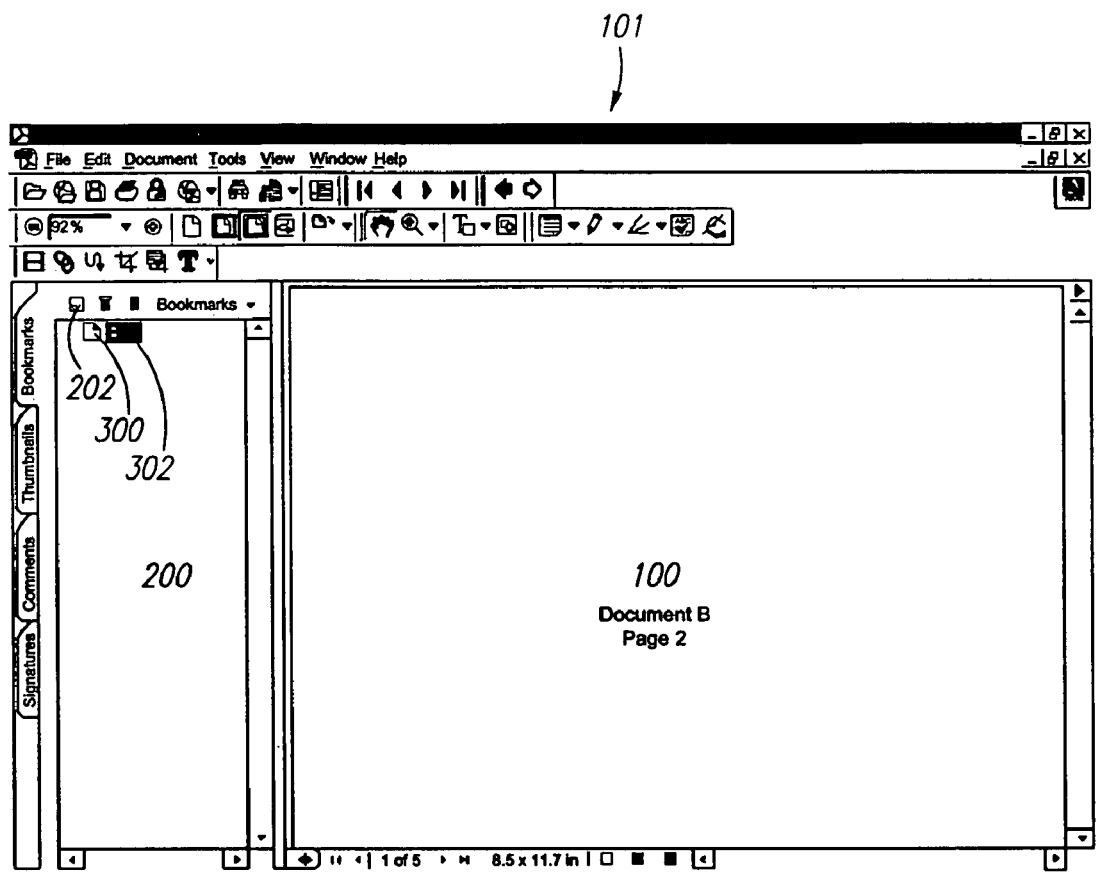
FIG. 3 is a view of a prior art display screen illustrating a bookmark and a title for the bookmark in the bookmark window.
Figure 4:
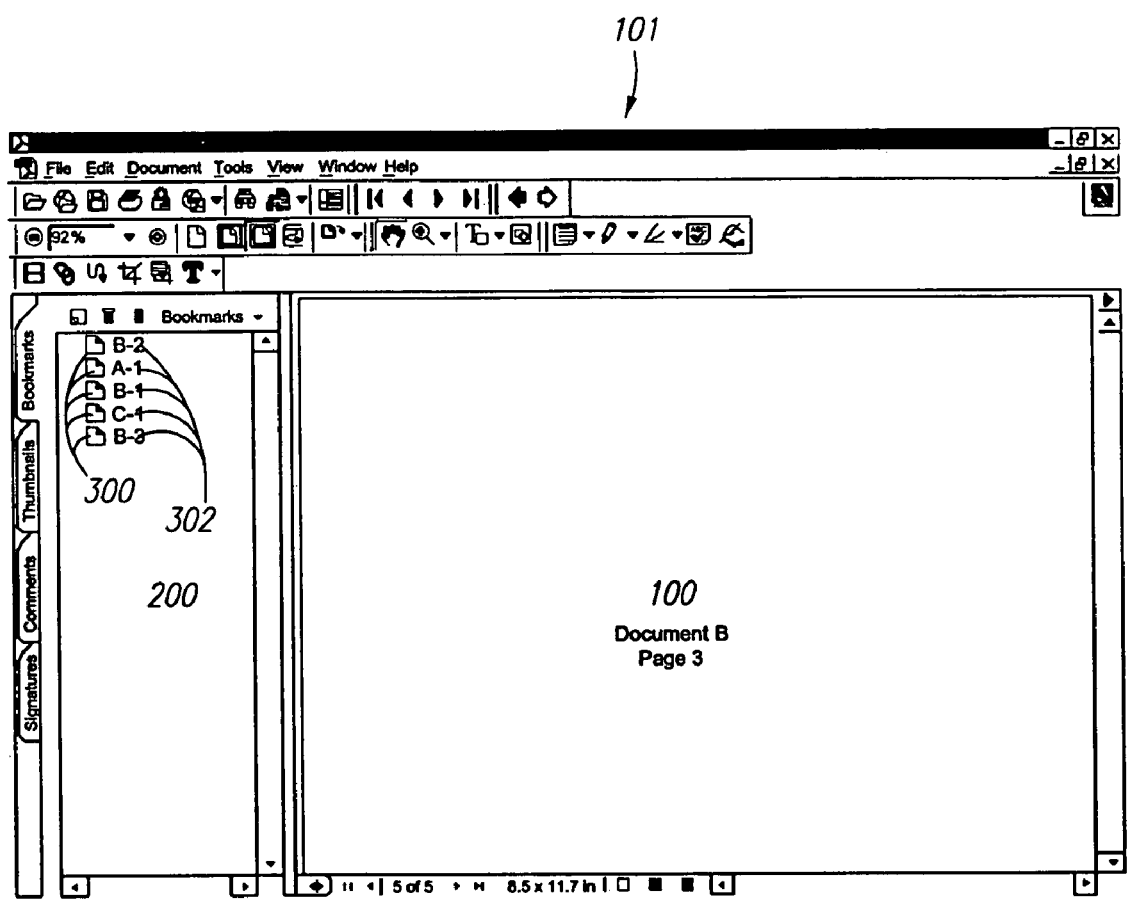
FIG. 4 is a view of a prior art display screen illustrating a number of bookmarks and corresponding titles for the bookmarks in the bookmark window.
Figure 5:
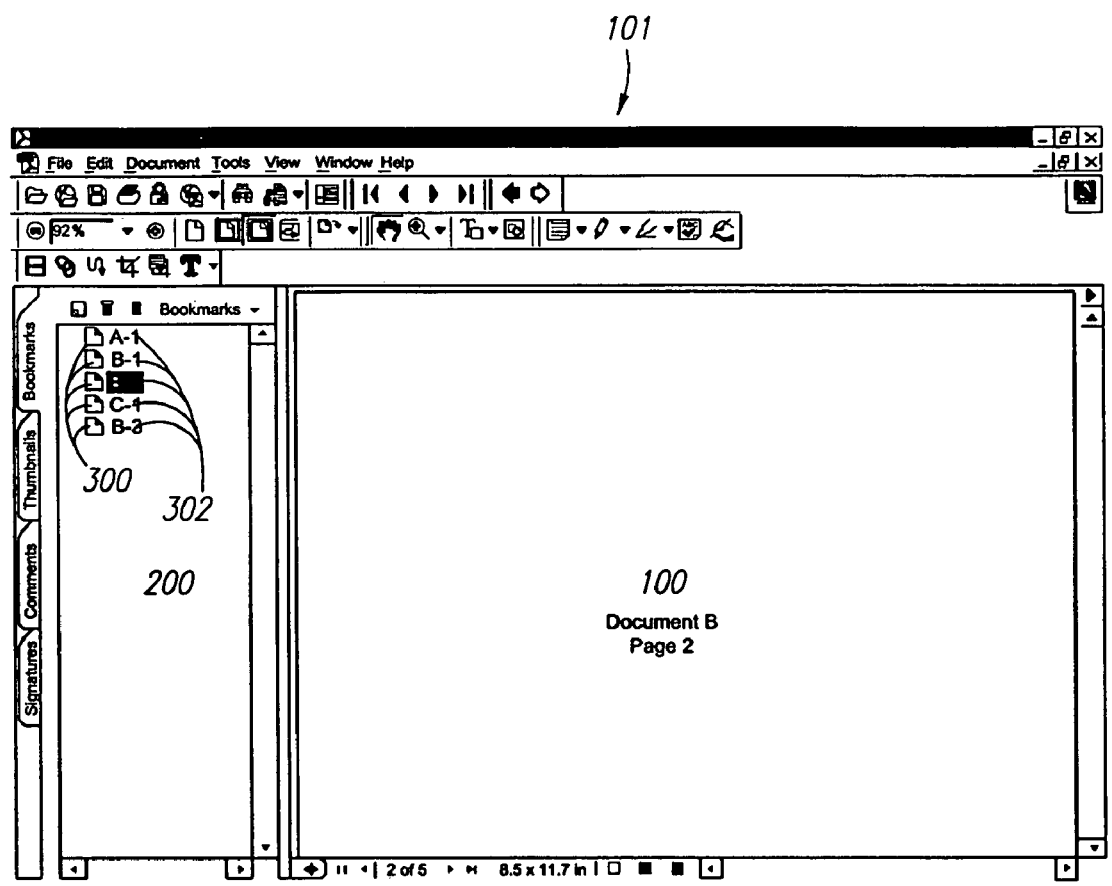
FIG. 5 is a view of a prior art display screen illustrating the bookmark B-2 moved to a location between the bookmark B-1 and the bookmark C-1.
Figure 6:
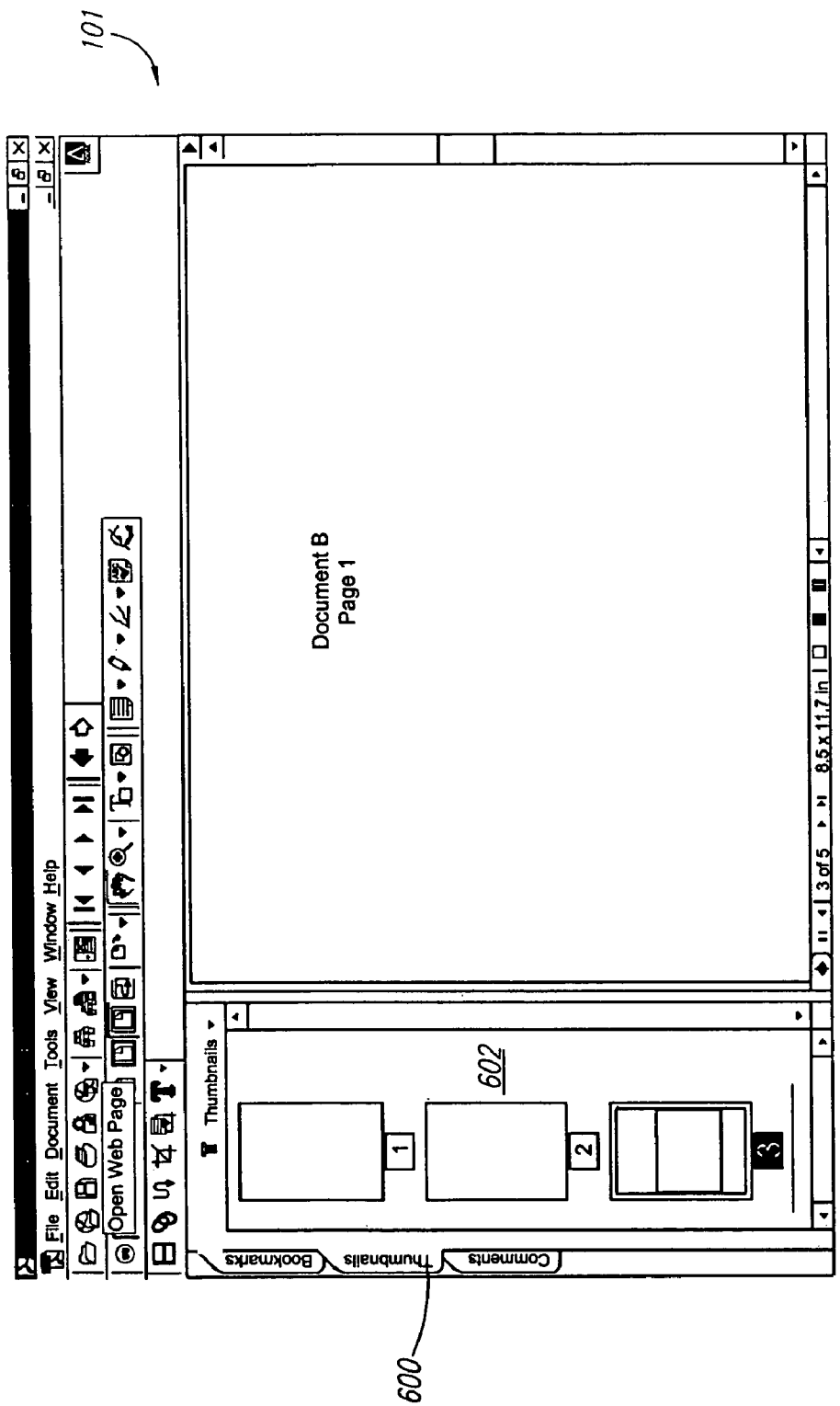
FIG. 6 is a view of a prior art display screen illustrating a thumbnail window, which displays a small view of the pages of the electronic document.
Figure 7:
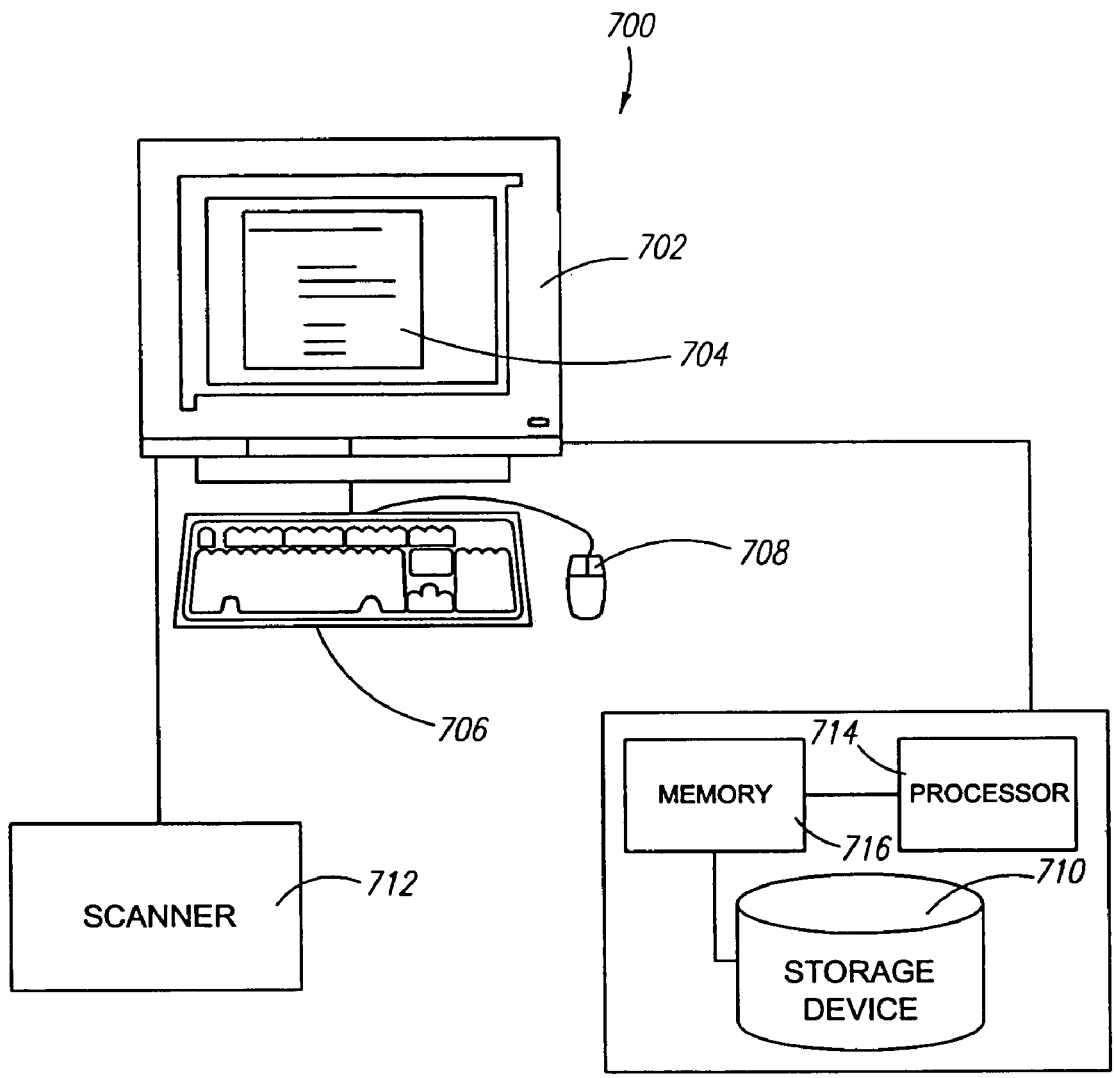
FIG. 7 is a simplified block diagram of a computer system having a software program for organizing pages of an electronic document in accordance with an embodiment of the present invention.

FIG. 7 is a simplified block diagram of a computer system 700 having a software program for grouping and organizing pages of an electronic document. The computer system 700 (e.g., a personal computer or workstation) includes a digital computer 702, a display screen 704, a keyboard 706, a mouse 708 or other pointing device, a storage device 710 (e.g., a hard disk drive, optical disk drive or floppy disk drive), and a scanner 712. The digital computer 702 can include a processor 714, a memory 716, and other customary components (e.g., memory bus and peripheral bus). The software program is generally stored in the memory 716 and executed by the processor 714. The computer system 700 can include an electronic scanning and viewing software program that communicates with the scanner 712 and generates an electronic document from the documents scanned in using the scanner 712. The electronic document can be stored in the storage device 710 and can be retrieved, rearranged, edited and saved using the software program. The present invention can be implemented using hardware, software or a combination of hardware and software.

Figure 8:
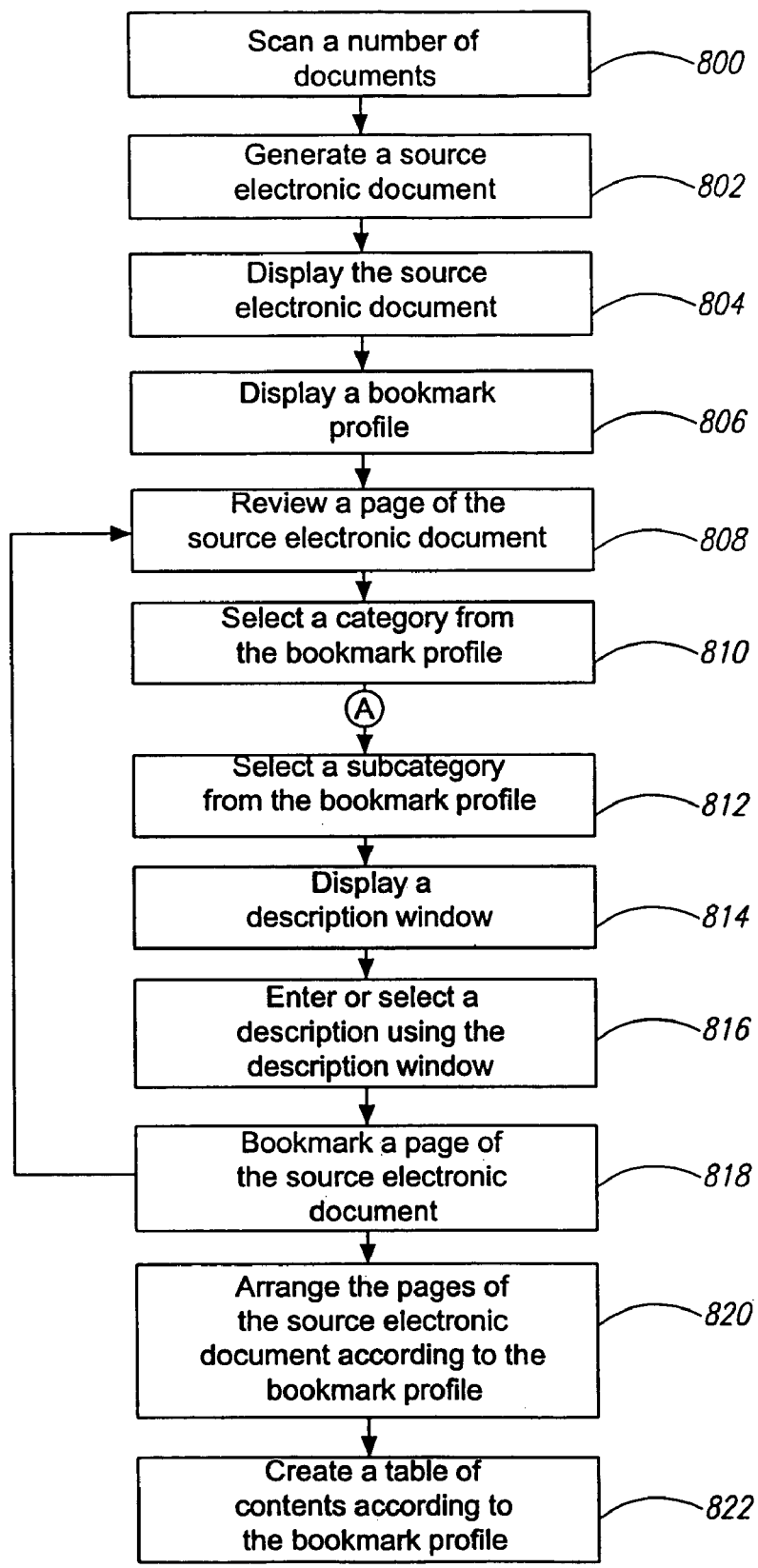
FIG. 8 is a simplified flow diagram illustrating a method for grouping and organizing pages of an electronic document in accordance with an embodiment of the present invention.

FIG. 8 is a simplified flow diagram illustrating a method for grouping and organizing pages of an electronic document. Initially, a number of paper documents or pages to be organized can be scanned in, using, for example, the computer system 700, which generates a source electronic document (steps 800, 802). The paper documents can be scanned in by a human who can manually feed in each page into the scanner 712 or by an automated system (not shown) that can automatically scan in one or more pages at a time. Alternatively, each paper document can be scanned in as a separate electronic document and the computer system 700 can concatenate or combine the separate electronic documents to form the source electronic document. The separate electronic documents may be scanned in from different locations and sent to the computer system 700, which can generate the source electronic document. Therefore, the efficiency of the scanning operation can be greatly enhanced by using a number of remote computer systems 700 to scan in the paper documents and send the electronic document to the main computer system 700, which concatenates or combines the separate electronic documents to form the source electronic document. The remote computer system 700 can generate the source electronic document and can send the source electronic document to the main computer system 700, which is capable of receiving and modifying the source electronic document. In one embodiment, an electronic document, such as a Word document, can be converted to the source electronic document using commercially available software programs. The source electronic document can be a PDF file, a Tagged Image File Format (TIFF) file, a Joint Photographic Experts Group (JPEG) file or any other type of electronic file that can be stored on the computer system 700. The remote computer system 700 can be the same, similar or different system than the main computer system 700.

Figure 9:
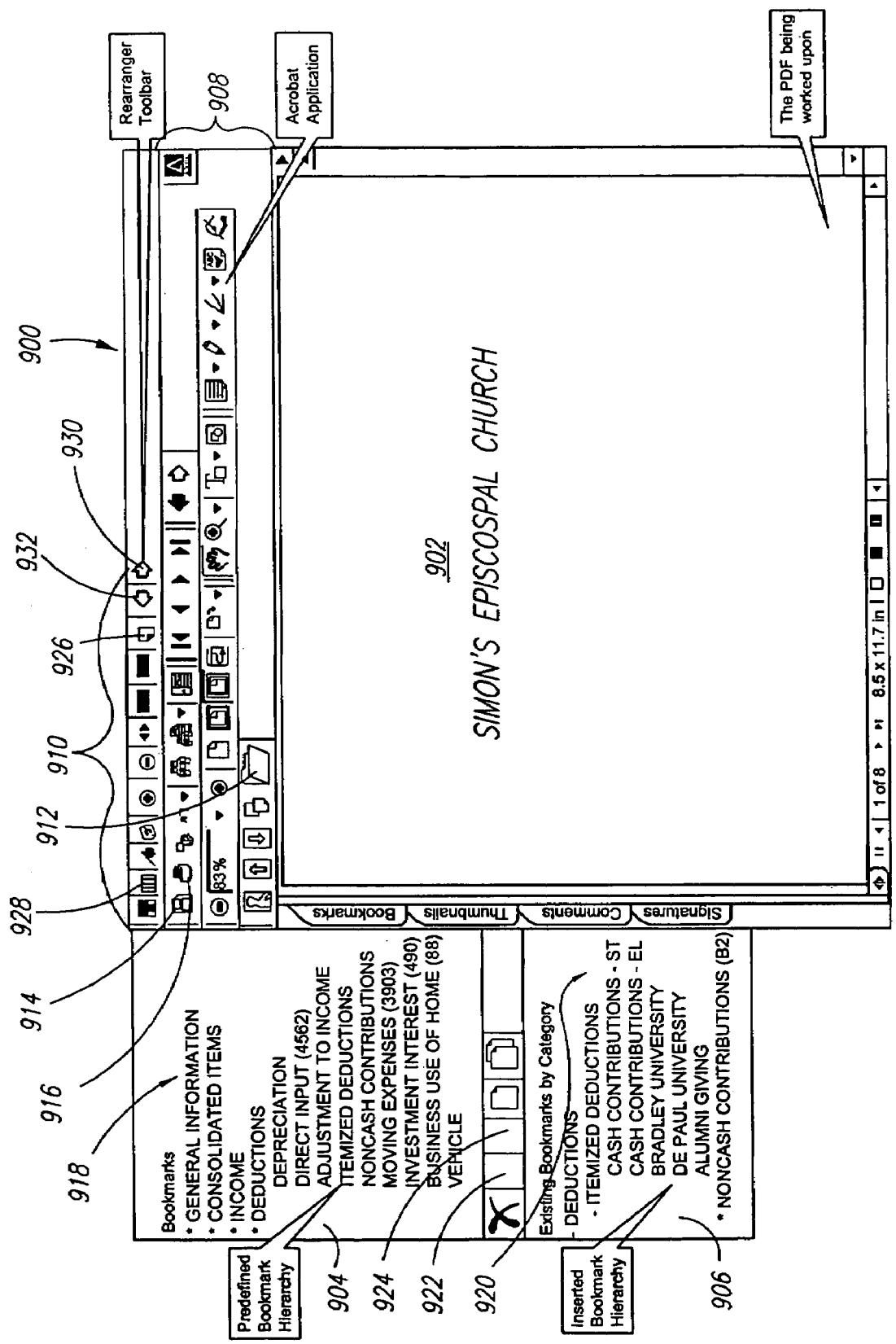
FIG. 9 is a view of a graphical user interface having a view area, a pre-defined bookmark area, a custom bookmark area, and a rearranger toolbar in accordance with an embodiment of the present invention.

FIG. 9 is a view of a graphical user interface 900 having a view area 902, a pre-defined bookmark area 904, a custom bookmark area 906, a standard toolbar 908, and a rearranger toolbar 910. Referring to FIGS. 7-9, the graphical user interface 900 is displayed on the display screen 704. The standard toolbar 908 includes an open button 912 for browsing the electronic documents stored on the computer system 700 and opening the source electronic document, a save button 914 for saving the displayed electronic document, and a print button 916 for printing the electronic document. Once the source electronic document has been located, the user can instruct the computer system 700 to open (using, for example, the open button 912) and display the source electronic document in the view area 902, which is where each page of the source electronic document is viewed and displayed (step 804).

Based on the contents of the source electronic document, the user can open a bookmark profile 918 that is customizable and suitable for a particular application or purpose. For example, the bookmark profile 918 can be specifically tailored for applications such as corporate taxes, individual taxes, partnership taxes, etc. Alternatively, the bookmark profile 918 can be selected by the computer system 700 based on the contents of the source electronic document and can be opened by the computer system 700 when the source electronic document is displayed on the display screen 704. The bookmark profile 918 can include a structured list of pre-defined categories and subcategories that are arranged in a particular order. For example, an accountant may need the categories and subcategories defined for the preparation of an individual tax return. That is, the categories and subcategories may include, for example, (1) general information (subcategories of CPA instructions, CPA forms, client information, dependents, estimated taxes), (2) consolidated items (subcategories of 1099 consolidated, settlement statements, handwritten information), (3) income (subcategories of W-2, interest, dividend, pensions, IRA, W-2G, miscellaneous income, net operating loss, schedule C—business income, schedule D—dispositions, schedule E—rental and royalty, schedule F—farm income, K-1's, oil and gas), (4) deductions (subcategories of depreciation, direct input (tax form number 4562), adjustment to income, itemized deductions, noncash contributions (8283), moving expenses (3903), investment interest (4952), business use of home (8829), vehicle/employee business expenses, foreign exclusions (2555), medical savings accounts and long-term care insurance contracts (8853)), (5) credits (subcategories of dependent care credit (2441), general business credits (3800), foreign tax credits (1116), fuel tax credit (4136), adoption credit (8839), education credit (8863), earned income credit, elderly, other credits), (6) taxes (subcategories of alternative minimum tax (6251), retirement plan taxes, household employment taxes, children under 14 (8615), parent's election (8814)), and (7) unused documents. The bookmark profile 918 can be created by a user via the computer system 700, stored in the storage device 710 and retrieved by (or using) the computer system 700. The pre-defined bookmark area 904 can display the bookmark profile 918 as a structured tree hierarchy and the custom bookmark area 906 can display the selected category and subcategory and corresponding custom descriptions 920 (step 806).

Once the bookmark profile 918 is displayed, the user can inspect or review a page of the source electronic document and decide which category and/or subcategory to choose for the page (step 808). For example, the user may review the first page and decide that it falls within the deductions category and the itemized deductions subcategory. The category, subcategory and description can be selected by positioning a pointer of the mouse 708 within the pre-defined bookmark area 904 or the custom bookmark area 906 over the desired category, subcategory or description 920 and depressing a button on the mouse 708. For example, the user can select the "+" box, which is adjacent to the category title, or select the category by, for example, clicking (e.g., double clicking) on the category, for selecting a category and displaying a list of the corresponding subcategories (step 810). The user can select the subcategory by, for example, clicking on the subcategory (step 812). To hide the list of subcategories, the user can select the "−" box, which is adjacent to the category title.

Figure 10:
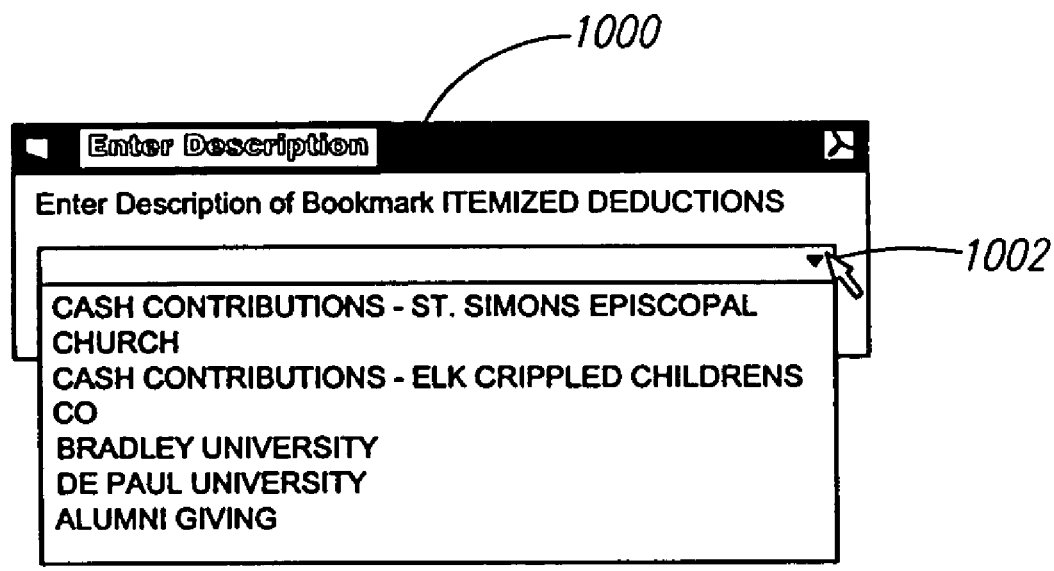
FIG. 10 is a view of a description window displayed on the modified display screen in accordance with an embodiment of the present invention.

Once the subcategory has been selected, a description window 1000 (as shown in FIG. 10) is displayed over the graphical user interface 900 for allowing the user to enter or select a custom description 920 for the bookmark (step 814). In one embodiment, the user can enter or input a new description using the keyboard 706 or select a previously input description from a pull down menu using the mouse 708 (step 816). The pull down menu can be viewed by selecting an arrow symbol 1002 on the description window 1000. Before entering in a new description, the user may want to view the existing descriptions using the pull down menu to determine if the desired description has already been entered. If the user enters a new description, the computer system 700 inserts the new description below the selected subcategory in the custom bookmark area 906.

The description 920 can describe the page displayed in the view area 902. In one embodiment, the description 920 can describe the page displayed in the view area 902 as well as one or more prior or subsequent pages. The custom bookmark area 906 can also display the list of custom descriptions 920 pertaining to the subcategories. For example, under the itemized deductions subcategory, the list of custom descriptions can include, for example, cash contributions—St. Simon's Episcopal Church, cash contributions—Elk Crippled Children's Company, Bradley University, DePaul University, and Alumni Giving. The storage device 710 can store the bookmark profile 918 and the descriptions 920, which can be retrieved by the computer system 700. In one embodiment, the term bookmark profile 91 8 can refer to the categories, subcategories and/or descriptions 920.

Once the description for a particular page has been entered or selected, the particular page is considered to be bookmarked and the description is added to the custom bookmark area 906. The bookmarks are arranged according to the categories and subcategories. The bookmarks are typically arranged and the titles are typically displayed in the order in which they are created. The user can change the order of the descriptions within a particular subcategory by selecting an up button 922 to move the description one level in the up direction and a down button 924 to move the description one level in the down direction. The up button 922 and the down button 924 are enabled and disabled based on the bookmark description selected with a subcategory. For example, if the first description is selected, only the down button 924 is enabled, and if the last description is selected, only the up button 922 is enabled. For any descriptions in between, both the up button 922 and the down button 924 are enabled.

The pages of the source electronic document can be bookmarked using the bookmark facility available in some of the currently available document scanning and viewing software programs (step 818). Each category and subcategory can have a unique bookmark identifier, instance or link (e.g., hypertext link) that correspond to the bookmarked page of the source electronic document. The description can also have a unique bookmark identifier, instance or link or the title of the description can function as the unique bookmark identifier. The unique bookmark identifier, instance or link may include a reference to the page number of the bookmarked page, i.e., the source electronic document. When the source electronic document is saved, the bookmarks may be embedded into the source electronic document, preferably in the category, subcategory and description hierarchy. The computer system 700 is configured to recognize the unique bookmark identifiers, instances and links and organize the pages of the source electronic document using the unique bookmark identifiers, instances and links.

After a page is bookmarked, the remaining pages until the next bookmarked page belong to the same bookmark. Hence, once a page is bookmarked, the user can view the next page to determine if it is related to the previous page and if so, the user does not need to bookmark the next page. For example, a source electronic document has a total of 15 pages. Initially, if page 1 is bookmarked, pages 1 to 15 all belong to the first bookmark. Now, if page 7 is bookmarked, pages 1 to 6 belong to the first bookmark and pages 7 to 15 belong to the second bookmark. Lastly, if page 4 is bookmarked, pages 1 to 3 belong to the first bookmark, pages 4 to 6 belong to the third bookmark, and pages 7 to 15 belong to the second bookmark. Hence, if consecutive pages are related, the user only needs to bookmark the beginning page. The user can return to step 808 until the desired pages of the source electronic document have been bookmarked.

The rearranger toolbar 910 includes a show bookmark information button 926 for showing information about the current page bookmark. As the user is moving through the source electronic document and bookmarking pages, the user may lose track of which page belongs to which bookmark. Therefore, the user can select the show bookmark information button 926, and the computer system 700 will display on the display screen 704, information about the bookmark (if any exists) to which the page belongs. The information about the bookmark can include the bookmarked page number, category, subcategory, description, and page range. For example, the information can be displayed as follows.

The page 5 belongs to the bookmark
Category—Income
Subcategory—K1
Description—ABC Corporation
From page 3 up to page 6

After the source electronic document has been bookmarked, the pages can be organized according to the bookmark profile 918, for example, the categories, subcategories and descriptions 920. The rearranger toolbar 910 includes a rearrange button 928 for rearranging the pages of the source electronic document based on the ordering dictated by the bookmark profile 918. That is, the computer system 700 arranges the pages of the source electronic document in the order of the categories, subcategories, and descriptions to create a structured electronic document (step 820). In one embodiment, the pages are organized according to the bookmark profile 918 using the unique bookmark identifiers, instances and links. The pages that are not bookmarked are arranged according to the previous bookmark. Therefore, upon selecting the rearranger button 928, the computer system 700 can rearrange the pages, insert the bookmarks, add page numbers and insert a table of contents into the source electronic document. The features of the present invention allows the structured electronic document to have a consistent pre-defined arrangement that allows the user to easily browse and navigate through the structured electronic document.

The computer system 700 creates a table of contents using the bookmark profile 918 and determines the number of pages of the table of contents (step 822). The computer system 700 adjusts the structured electronic document by adding the number of pages of the table of contents to each of the bookmarks. For example, if the table of contents includes 3 pages, the computer system 700 adds 3 to each bookmark. In one embodiment, the computer system 700 creates the table of contents by converting the bookmark profile 918 into a postscript file and distilling the postscript file using a distiller computer program such as the Adobe Distiller computer program. The computer system 700 then inserts the pages of the table of contents at the top of the structured electronic document. The user can then save the structured electronic document using the save button 914. Once the source electronic document exists, additional scanned in documents or pages may need to be added to the source electronic document. These pages can be referred to as subsequent pages. In this situation, the user can receive the pages that have been scanned in and can concatenate the subsequent pages with the source electronic document. The computer system 700 places each subsequent page at the end of the source electronic document and inserts a tag on each subsequent page indicating that the page has been added. The user can then proceed to add or select a bookmark for each subsequent page. However, after the pages of the source electronic document are rearranged according to the bookmark profile 918, the subsequent pages can be dispersed throughout the source electronic document. Once the pages have been rearranged, the user can still locate the subsequent pages by using a forward button 930 to move to the next subsequent page and a backward button 932 to move to the previous subsequent page. The computer system 700 can scroll through the subsequent pages by searching for the tags. The forward button 930 and the backward button 932 are enabled when there is at least one subsequent page in the source electronic document. This allows the user to only have to scroll through the added pages even though the added pages have been rearranged throughout the source electronic document. This scroll feature provides the advantage of saving the user time by allowing the user to only have to review the added pages. In addition, the scroll feature allows the user to add pages and documents that might have been forgotten or later discovered or received. Once all subsequent documents are reviewed, the electronic document can be approved and then the subsequent document tags are removed. From this point on, only newly submitted documents will receive the subsequent document tag until they to are reviewed and approved.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Other embodiments are within the scope of the following claims. accordingly, the present invention is not intended to be limited by the preferred embodiments, but is to be defined by reference to the appended claims.

What is claimed is:

1. A computer-implemented method for organizing a plurality of pages of an electronic tax document based on a plurality of tax preparation categories, comprising:
    defining a bookmark profile comprising a plurality of tax preparation categories listed in a predefined bookmark order;
    defining a first bookmark and a second bookmark, the first bookmark and the second bookmark each containing at least one tax preparation category;
    associating the first bookmark with a first page of the electronic tax document;
    associating the second bookmark with a second page of the electronic tax document, the second page subsequent in order to the first page in the electronic tax document;
    associating the first bookmark with a first plurality of pages corresponding to all pages of the electronic tax document between the first page and the second page;
    associating the second bookmark with a second plurality of pages corresponding to all pages of the electronic tax document subsequent to the second page;
    displaying the first bookmark and the second bookmark; and
    arranging the first and second plurality of pages of the electronic tax document into the predefined bookmark order based on the plurality of tax preparation categories, the predefined bookmark order different than a previous order of the pages of the electronic tax document.

2. The method of claim 1, further comprising receiving the electronic tax document having a plurality of pages wherein the electronic tax document is selected from a group consisting of a PDF file, a TIFF file and a JPEG file.

3. The method of claim 1, further comprising:
    receiving a subsequent page;
    combining the subsequent page with the plurality of pages; and
    inserting a tag on the subsequent page.

4. The method of claim 1, further comprising inserting a description into one of the plurality of tax preparation categories.

5. The method of claim 1, wherein the bookmark profile includes a plurality of subcategories.

6. The method of claim 5, further comprising:
    displaying the plurality of subcategories;
    receiving a selected subcategory from the plurality of subcategories; and
    displaying a description adjacent to the selected subcategory.

7. The method of claim 1, wherein associating the first bookmark with a first page of the electronic tax document comprises:
    assigning a description identifier to the first page; and
    inserting the description identifier into the first page.

8. The method of claim 1, further comprising:
    generating a table of contents using a bookmark profile;
    determining the number of pages of the table of contents;
    shifting the plurality of pages to accommodate for the table of contents; and
    inserting the table of contents before the plurality of pages.

9. The method of claim 1, further comprising:
    displaying the plurality of tax preparation categories;
    receiving a selected category from the plurality of categories; and
    displaying a description adjacent to the selected category.

10. The method of claim 3, further comprising scanning in and concatenating the subsequent pages of the electronic tax document, and inserting a tag on each subsequent page indicating that the page has been added.

11. The method of claim 1, further comprising activating a rearranger button that causes the computer to rearrange the pages, insert the bookmarks, add page numbers and insert a table of contents into the electronic tax document, based on the ordering dictated by a bookmark profile.

12. The method of claim 1, further comprising:
    generating a table of contents using a bookmark profile;
    determining the number of pages of the table of contents;
    shifting the plurality of pages according to the number of pages of the table of contents to accommodate for the table of contents; and
    inserting the table of contents before the plurality of pages and at the top of the plurality of pages.

* * * * *

UNITED STATES PATENT AND TRADEMARK OFFICE
CERTIFICATE OF CORRECTION

PATENT NO.        : 7,636,886 B2                                          Page 1 of 1
APPLICATION NO.   : 10/422133
DATED             : December 22, 2009
INVENTOR(S)       : Wyle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Ninth Day of November, 2010

David J. Kappos
*Director of the United States Patent and Trademark Office*